(12) United States Patent
Ohkubo et al.

(10) Patent No.: US 9,097,340 B2
(45) Date of Patent: Aug. 4, 2015

(54) WORK VEHICLE

(71) Applicant: Kubota Corporation, Osaka-shi (JP)

(72) Inventors: Seiji Ohkubo, Sakai (JP); Fumitake Okunishi, Sakai (JP); Yasutaka Kido, Sakai (JP)

(73) Assignee: Kubota Corporation, Osaka (JP)

( * ) Notice: Subject to any disclaimer, the term of this patent is extended or adjusted under 35 U.S.C. 154(b) by 312 days.

(21) Appl. No.: 13/786,535

(22) Filed: Mar. 6, 2013

(65) Prior Publication Data

US 2013/0298546 A1 Nov. 14, 2013

(30) Foreign Application Priority Data

May 11, 2012 (JP) ................... 2012-109802

(51) Int. Cl.
*F16D 31/02* (2006.01)
*F16H 61/423* (2010.01)
*F04B 17/05* (2006.01)
*F16H 39/14* (2006.01)
*F04B 1/32* (2006.01)
*F04B 49/00* (2006.01)
*F03C 1/26* (2006.01)
*F16H 61/462* (2010.01)

(52) U.S. Cl.
CPC ................ *F16H 61/423* (2013.01); *F03C 1/26* (2013.01); *F04B 1/324* (2013.01); *F04B 17/05* (2013.01); *F04B 49/002* (2013.01); *F16H 39/14* (2013.01); *F16H 61/462* (2013.01)

(58) Field of Classification Search
CPC ....... F16H 39/10; F16H 39/14; F16H 61/423; F16H 61/462; F04B 1/324; F04B 49/002
USPC ............................ 60/488, 490; 91/505, 506
See application file for complete search history.

(56) References Cited

U.S. PATENT DOCUMENTS

| | | | | |
|---|---|---|---|---|
| 3,054,263 A | * | 9/1962 | Budzich et al. | 60/447 |
| 4,236,596 A | * | 12/1980 | Abels | 60/492 |
| 2007/0068152 A1 | * | 3/2007 | Nishi et al. | 60/490 |

FOREIGN PATENT DOCUMENTS

| | | |
|---|---|---|
| JP | 59175671 A | 10/1984 |
| JP | 4181063 A | 6/1992 |
| JP | 201053952 A | 3/2010 |

* cited by examiner

*Primary Examiner* — Michael Leslie
(74) *Attorney, Agent, or Firm* — The Webb Law Firm (57) ABSTRACT

A hydraulic actuator is arranged such that the hydraulic actuator operates a swash plate of a hydraulic motor by a first pilot pressure and a second pilot pressure, the first pilot pressure being branched from a high-speed oil passage and applied to the hydraulic actuator for operating the swash plate of the hydraulic motor to a low speed side, the second pilot pressure being branched from a charge pump and applied to the hydraulic actuator for operating the swash plate of the hydraulic motor to a high speed side.

3 Claims, 6 Drawing Sheets

WORK VEHICLE

TECHNICAL FIELD

The present invention relates to a speed changer arrangement for a hydraulic pump and a hydraulic motor of a hydrostatic stepless speed changer apparatus for use in a work vehicle having such hydrostatic stepless speed changer apparatus for vehicle traveling.

BACKGROUND ART

As a utility vehicle which is an example of a work vehicle, the Japanese Unexamined Patent Application Publication No. 2010-53952 (see SM, 12, 59-62, a, b, h in FIG. 7) discloses a utility vehicle having a hydrostatic stepless speed changer apparatus configured as described below. Namely, a hydraulic pump and a hydraulic motor are coupled to each other via a high-pressure oil passage and a low-pressure oil passage. As work oil is fed from the hydraulic motor via the high-pressure oil passage to the hydraulic motor, this hydraulic motor is driven; and the work oil from the hydraulic motor is returned via the low-pressure oil passage to the hydraulic pump. The hydraulic pump is configured as a variable displacement type. So that, as a driver operates a speed changer operational tool, the swash plate of the hydraulic pump is operated in stepless manner to effect a speed changing operation.

In the Japanese Unexamined Patent Application Publication No. 2010-53952, the hydraulic pump too is configured as a variable displacement type, and there is provided a hydraulic cylinder for operating the swash plate of the hydraulic motor. A coil spring is mounted in a bottom side oil chamber of the hydraulic cylinder, so that the hydraulic cylinder is urged to its extending side (the high speed side of the swash plate of the hydraulic motor). A pilot pressure branched from the high-pressure oil passage is fed to a rod-side oil chamber of the hydraulic cylinder.

Figure 5:
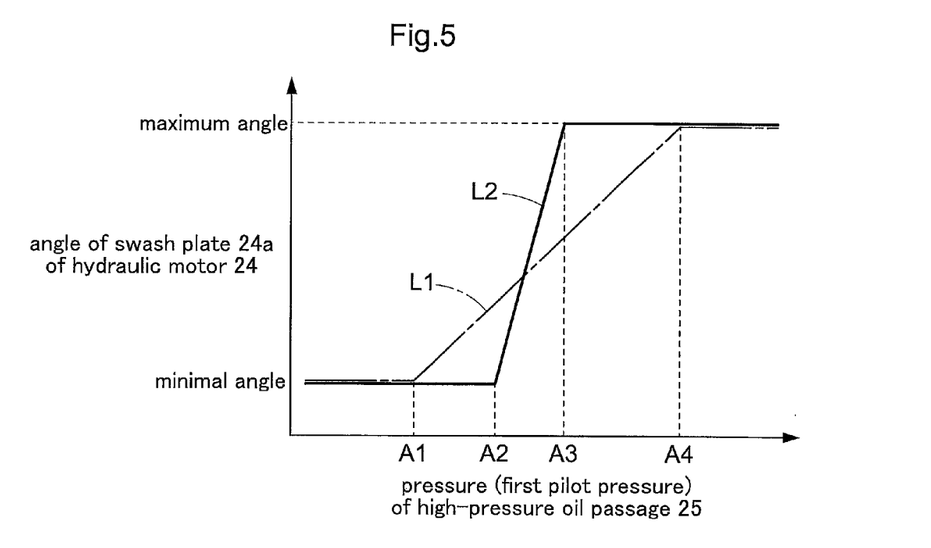
FIG. 5 is a view illustrating relationship between a pressure of a high-pressure oil passage (first pilot pressure) and an angle of a swash plate of a hydraulic motor.

For instance, as indicated by the one-dot chain line L1 in FIG. 5 for instance, under a normal traveling condition, the hydraulic cylinder is extended by the urging force of the coil spring, whereby the swash plate of the hydraulic motor is operated to its minimal angle (high speed side). As is the case with e.g. an upslope, as the traveling load increases, there occurs rise in the pressure of the high-speed oil passage. Hence, the pilot pressure branched from the high-speed oil passage causes the hydraulic cylinder to be contracted against the urging force of the coil spring, whereby the swash plate of the hydraulic motor is operated to the low-speed side, thus alleviating the load to be applied to the engine.

SUMMARY OF THE INVENTION

According to the Japanese Unexamined Patent Application Publication No. 2010-53952 (Patent Document 1), the hydraulic cylinder for operating the swash plate of the hydraulic motor is provided with the coil spring for urging the hydraulic cylinder to its extending side (the high-speed side of the swash plate of the hydraulic motor).

With this, under the extended state of the hydraulic cylinder, the coil spring too is extended, so the resistance from the coil spring against the contracting operation of the hydraulic cylinder (the low-speed side of the swash plate of the hydraulic motor) is small. Conversely, when the hydraulic cylinder is contracted, the coil spring is compressed. This causes increase in the resistance from the coil spring against the contracting operation of the hydraulic cylinder (the low-speed side of the swash plate of the hydraulic motor).

In Patent Document 1 described above, as indicated by the one-dot chain line L1 in FIG. 5 for instance, when there occurs a change from the normal traveling condition (the condition wherein the hydraulic cylinder is extended and the swash plate of the hydraulic motor is operated to the minimal angle (high speed side) to an upslope traveling thus resulting in increased traveling load (i.e. rise in the pressure of the high-pressure oil passage), there will be provided a condition wherein equilibrium is established between the pressure of the high-pressure oil passage and the urging force of the coil spring at a relative low pressure A1 (that is, the pressure of the high-pressure oil passage reaches equilibrium with the urging force of the coil spring relatively early).

Thereafter, in association with rise in the traveling load (in association with rise of the pressure of the high-pressure oil passage from the pressure A1), the hydraulic cylinder is contracted (due to the decreased resistance from the coil spring against the contracting operation of the hydraulic cylinder (the low speed side of the swash plate of the hydraulic motor), whereby the swash plate of the hydraulic motor is operated to the low speed side. As a result, there occurs tendency of the traveling speed of the vehicle decreasing relatively rapidly. And, in association with the contracting operation of the hydraulic cylinder, the coil spring is compressed, thereby to provide a progressively increased urging force.

Under the condition when the traveling load is relative large (the pressure of the high-pressure oil passage is relatively high) and the swash plate of the hydraulic motor is operated to the low speed side, if there now arises a need for operating the swash plate of the hydraulic motor to the low speed side to cope with further increase in the traveling load, as indicated by the one-dot chain line L1 in FIG. 5 for instance, as the swash plate of the hydraulic motor cannot be easily operated to the low speed side (because the coil spring is compressed, so that this coil spring provides greater resistance against the contracting operation of the hydraulic cylinder) (the low speed side of the swash plate of the hydraulic motor), there tends to occur a lag or delay in the operation of the swash plate of the hydraulic motor to the low speed side.

With the above, if the traveling load fails to rise sufficiently (the pressure of the high-pressure oil passage fails to reach a sufficiently high pressure A1), the swash plate of the hydraulic motor cannot be operated to its maximum angle (low speed side).

In a work vehicle having a hydrostatic stepless speed changer apparatus for vehicle traveling, in case the hydraulic pump and the hydraulic motor of the stepless speed changer apparatus are configured respectively as the variable displacement type, there is a need for improvement of the arrangement such that even when the traveling load rises from the normal traveling condition, the traveling speed of the vehicle body can be maintained constant for a certain period of time, not resulting in premature sharp reduction in the traveling speed of the vehicle body. Similarly, there is a need for improvement such that when the traveling load is relatively large and this traveling load becomes even larger, there occurs no lag in the operation of the swash plate of the hydraulic motor to the low speed side.

According to the present invention, a work vehicle comprises:
  an engine;
  a traveling hydrostatic stepless speed changer apparatus including,
    a variable displacement type hydraulic pump driven by the engine;
    a variable displacement type hydraulic motor driven by work oil from the hydraulic pump, and a high-pressure oil passage and a low-pressure oil passage connecting the hydraulic pump with the hydraulic motor;

a hydraulic actuator manually operable for operating a swash plate of the hydraulic motor; and a charge pump driven by the engine for feeding the work oil to the high-pressure oil passage and the low-pressure oil passage;

wherein the hydraulic actuator is arranged such that the hydraulic actuator operates the swash plate of the hydraulic motor by a first pilot pressure and a second pilot pressure, the first pilot pressure being branched from the high-speed oil passage and applied to the hydraulic actuator for operating the swash plate of the hydraulic motor to a low speed side, the second pilot pressure being branched from the charge pump and applied to the hydraulic actuator for operating the swash plate of the hydraulic motor to a high speed side.

[I]-1

With the above-described arrangement, if there is provided a hydraulic actuator for operating the swash plate of the hydraulic motor, the hydraulic actuator operates the swash plate of the hydraulic motor to the low speed side by the first pilot pressure branched from the high-speed oil passage, whereas, the the hydraulic actuator operates the swash plate of the hydraulic motor to the high speed side by the second pilot pressure branched from the charge pump, so that the hydraulic actuator is stopped at the position where equilibrium is established between the first pilot pressure and the second pilot pressure (angle of the swash plate of the hydraulic motor).

In this case, the charge pump is driven by the engine which drives the hydraulic pump also. Hence, when there occurs a change in the rotational speed of the engine due to the traveling load, this results in a change in the rotational speed of the charge pump, as well as a change in the discharge pressure of the charge pump (the second pilot pressure).

[I]-2

Under the condition described in the foregoing section [I]-1, as indicated by a solid line L2 in FIG. 5 for instance, when the normal traveling condition (i.e. the condition wherein there is no reduction in the rotational speed of the engine and the swash plate of the hydraulic motor is operated to its minimal angle (high speed) is shifted to an upslope traveling, since the rotational speed of the engine is not yet reduced and the second pilot pressure (discharging pressure of the charge pump) is still relatively high. So, even when the traveling load rises (even if the pressure of the high-pressure oil passage rises), due to the resistance provided by the relatively high second pilot pressure (discharging pressure of the charge pump), the hydraulic actuator will not be immediately operated to the low speed side for the swash plate of the hydraulic pump.

Thereafter, as the traveling load rises sufficiently, the first pilot pressure (the pressure of the high-pressure oil passage) rises correspondingly and also the second pilot pressure (discharging pressure of the charge pump) drops in association with the reduction in the rotational speed of the engine due to the rise in the traveling load. In response to these, by the relatively high first pilot pressure (pressure of the high-pressure oil passage) (A2), the hydraulic actuator is now operated to the low speed side for the swash plate of the hydraulic pump.

With the above, even when the traveling load rises from the normal traveling condition, this does not lead to immediate operation of the swash plate of the hydraulic motor to the low speed side, but the traveling speed of the vehicle body can be maintained constant for a certain period of time. As a result, the traveling performance of the work vehicle has been improved.

[I]-3

After the condition described in the foregoing section [I]-2, as indicated by the solid line L2 in FIG. 5 for instance, in response to rise in the traveling load (rise of the pressure of the high-pressure oil passage from the pressure A2) and reduction in the rotational speed of the engine due to the rise in the traveling load, there occurs reduction in the second pilot pressure (discharging pressure of the charge pump). With this, the hydraulic actuator is operated relatively sharply to the low speed side for the swash plate of the hydraulic motor. So, by the first pilot pressure (pressure of the high-pressure oil passage) at a pressure A3 which is relatively close to the pressure A2, the hydraulic actuator is rendered into the condition for operating the swash plate of the hydraulic motor to the maximum angle (low speed). In this case, as shown in FIG. 5 for instance, the pressure A3 which relates to the first characterizing feature of the present invention is lower than a pressure A4 which provides the maximum angle (low speed) in the hydraulic motor in Patent Document 1.

With the above, as indicated by the solid line L2 in FIG. 5 for instance, under the condition wherein the traveling load is relatively high (the pressure of the high-pressure oil passage is relatively high) and the swash plate of the hydraulic motor is operated to the low speed side, it it likely that reduction in the rotational speed of the engine due to the significant traveling load has occurred already, so that the second pilot pressure (discharging pressure of the charge pump) too has been reduced also already.

Under the above-described condition, if the traveling load further increases, since the second pilot pressure (discharging pressure of the charge pump) is relatively low and the resistance of the second pilot pressure (discharging pressure of the charge pump) is small, with the first pilot pressure (pressure of the high-pressure oil passage), the hydraulic actuator will be immediately operated to the low speed side of the swash plate of the hydraulic pump.

With the above, under the relatively high traveling load condition, if there occurs further increase in the traveling load, the operation of the swash plate of the hydraulic motor to the low speed side will take place without lag. Hence, the traveling performance of the work vehicle has been improved.

In the above-described arrangement, preferably, there is provided an operational mechanism for urging the swash plate of the hydraulic motor to the high speed side.

With the above-described arrangement, separately of the hydraulic actuator for operating the swash plate of the hydraulic motor, there is provided an operational mechanism for urging the swash plate of the hydraulic motor to the high speed side. With this, as described in the foregoing section [I]-2, for instance, under the normal traveling condition (no reduction has occurred in the rotational speed of the engine and the swash plate of the hydraulic motor is operated to the high speed side), if this condition is now shifted to an upslope traveling, to the relatively high second pilot pressure (discharging pressure of the charge pump), the operational mechanism is added as a further "resistance".

Therefore, when the traveling load increases from the normal traveling condition, it is possible to delay the operation of the swash plate of the hydraulic motor to the low speed side (it is possible to make it difficult for the swash plate of the hydraulic pump to be operated to the low speed side). Hence, there can be obtained an arrangement particularly suitable for a work vehicle which places more importance on maintaining vehicle traveling speed constant.

In the above-described arrangement, preferably, the operational mechanism urges the swash plate of the hydraulic motor to the high speed side by a third pilot pressure branched from the low-pressure oil passage.

For instance, in case the swash plate of the hydraulic pump is operated to the low speed side (the smaller side of the capacity (discharge amount)) by a speed changer operational tool in order to limit the traveling speed of the vehicle body e.g. on a downslope, a "dynamic brake" corresponding to the engine brake of a standard passenger automobile will often be activated.

Referring to this dynamic brake, e.g. on a downslope or the like, when the hydraulic motor is driven by the reverse drive force from the ground surface, with the work oil discharged from the hydraulic motor, the pressure of the low-pressure oil passage becomes higher than the pressure of the high-pressure oil passage, so that the hydraulic pump will be driven by the work oil discharged from the hydraulic motor (low-pressure oil passage). Under this condition, if the swash plate of the hydraulic motor is operated to the low speed side (the smaller side of the capacity (discharge amount)) to making it difficult for the hydraulic pump to be driven (the condition of attempting to drive the engine driving the hydraulic pump forcibly at a high speed), the driving resistance of the hydraulic pump increases. This is the phenomenon referred to as the dynamic brake mentioned above.

However, if the dynamic brake described is activated, the dynamic brake may act excessively to bring about sharp sudden speed reduction of the vehicle body, thus providing uncomfortable riding feel. This phenomenon appears more conspicuously when there is a significant difference between the capacity (discharging amount) (angle of swash plate) of the hydraulic motor and the capacity (discharging amount) (angle of swash plate) of the hydraulic pump.

[III]-2

With the above-described inventive arrangement, the operational mechanism for urging the swash plate of the hydraulic motor described in the foregoing section [II] is configured to urge the swash plate of the hydraulic motor with a third pilot pressure branched from the low-pressure oil passage.

With this, e.g. on a downslope or the like, when the hydraulic motor is driven by the reverse drive force from the ground surface, with the work oil discharged from the hydraulic motor, the pressure of the low-pressure oil passage becomes higher than the pressure of the high-pressure oil passage, the operational mechanism operates the swash plate of the hydraulic motor to the high speed side (capacity (discharging amount)) with the third pilot pressure (low-pressure oil passage).

Therefore, as described in the foregoing section [III]-1, even when the swash plate of the hydraulic pump is operated by the speed changer operational tool to the low speed side (the smaller side of capacity) (discharging amount)), the swash plate of the hydraulic motor will similarly be operated to the high speed side (the smaller side of capacity) (discharging amount)), so that the difference between the capacity (discharging amount) (angle of swash plate) of the hydraulic motor and the capacity (discharging amount) (angle of swash plate) of the hydraulic pump will be restricted; hence, the action of the dynamic brake will be appropriately restricted.

With the above, as excessive manifestation of the dynamic brake phenomenon is restricted, occurrence of such condition of sharp sudden speed reduction of the vehicle body will be less likely to occur, so that deterioration in the riding comfort can be prevented.

DESCRIPTION OF EMBODIMENT

[1]

Figure 1:
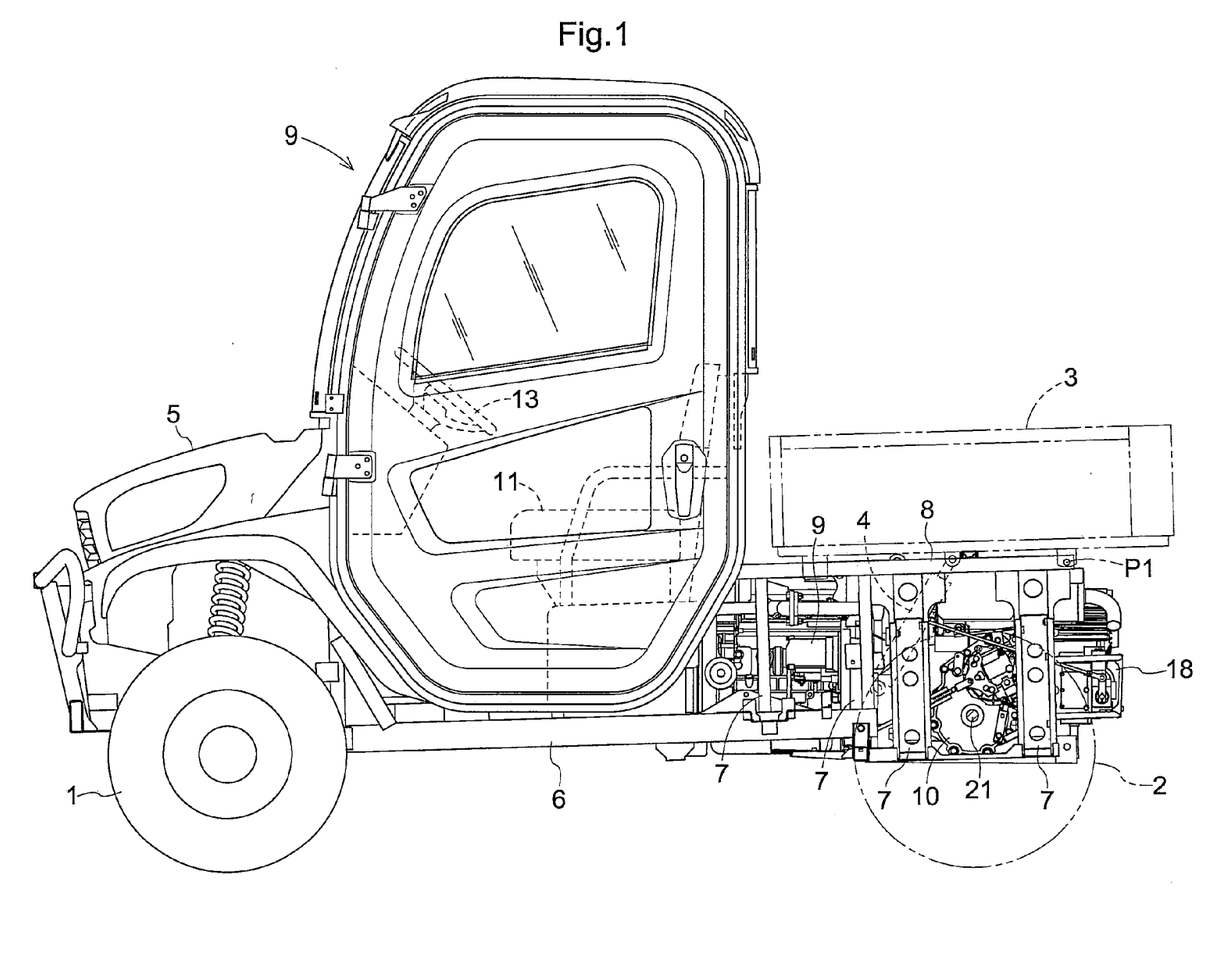
FIG. 1 is an overall side view of a work vehicle.
Figure 2:
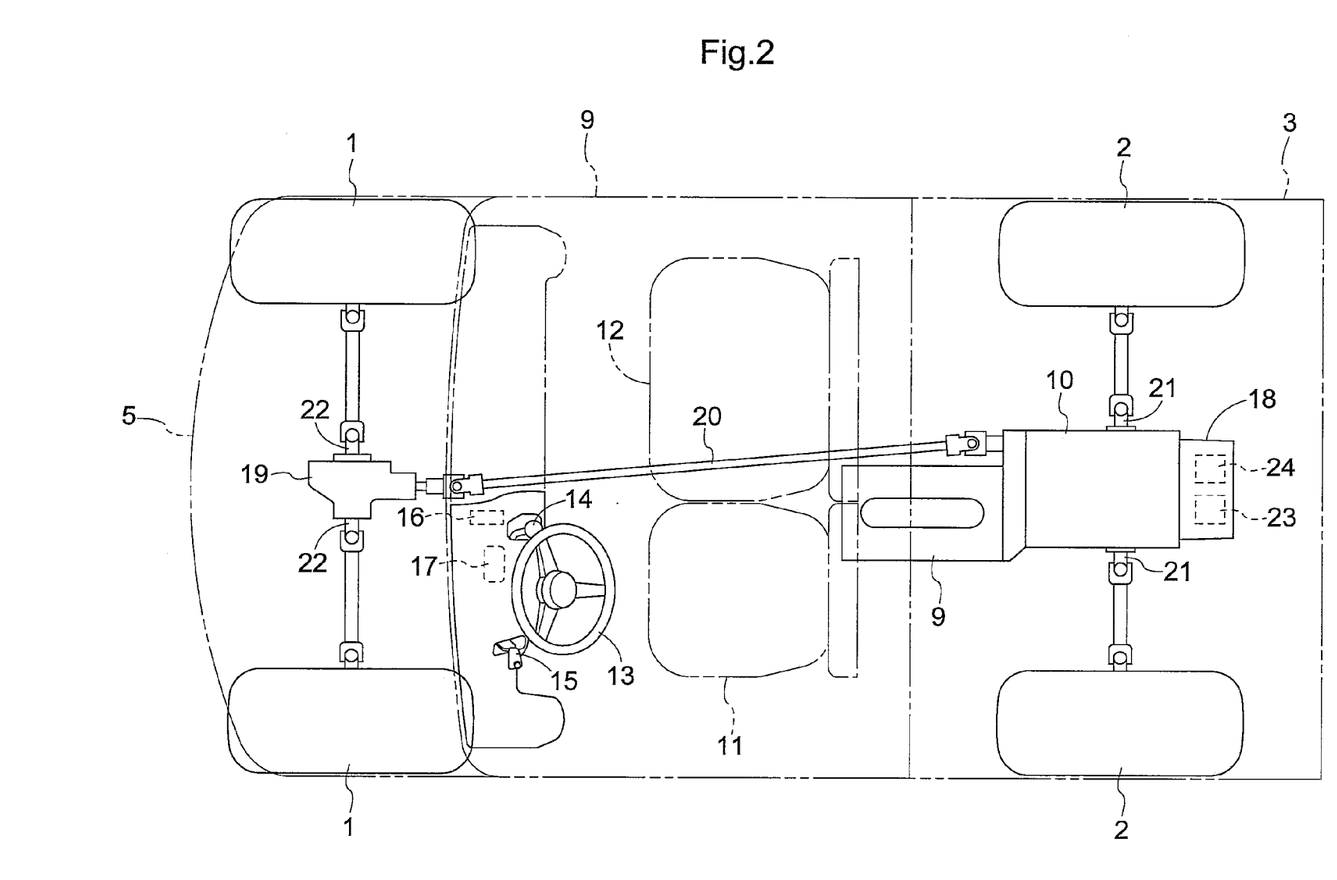
FIG. 2 is a plane view showing a schematic arrangement of the work vehicle.

Next, one embodiment of the present invention will be described with reference to the accompanying drawings. As shown in FIG. 1 and FIG. 2, there is shown a work vehicle as a utility vehicle for effecting e.g. transporting of agricultural products, luggage, etc. In the vehicle body of this work vehicle, vertical frames 7 are connected to rear portions of right and left main frames 6 extending along the vehicle body front-rear direction; and right and left upper frames 8 are connected along the vehicle body right-left direction to the upper portions of the vertical frames 7. And, to this vehicle body, right and left front wheels 1 and right and left rear wheels 2 are supported via a double wishbone suspension mechanism (not shown).

As shown in FIG. 1 and FIG. 2, at the front portion of the vehicle body, there is provided a hood 5 covering the right and left front wheels 1 and at the center of the vehicle body, there is mounted a cabin 9. To the rear portions of the right and left upper frames 8, a truck bed 3 is supported to be vertically pivotable relative thereto. There is also provided a lift cylinder 4 for lifting the truck bed 3 up/down.

As shown in FIG. 1 and FIG. 2, the cabin 9 includes a driver's seat 11 and a passenger's seat 12. Forwardly of the driver's seat 11, there are mounted a steering wheel 13 for steering operation, a speed changer lever 14, a brake lever 15, a speed changer pedal 16 (corresponding to "a speed changer operational tool"), and a brake pedal 17.

[2]

Next, the arrangement of a transmission system for traveling will be described.

As shown in FIG. 1 and FIG. 2, an engine 9, a transmission case 10 and a hydrostatic stepless speed changer apparatus 18 are connected to each other to form a single unit. And, this unit is supported to the rear portions of the right and left main frames 6 in such a manner that the engine 9 is disposed forwardly. To the front portions of the right and left main frames 6, a front wheel differential mechanism 19 is supported and a transmission shaft 20 is connected between the transmission case 10 and the front wheel differential mechanism 19.

As shown in FIG. 2, inside the transmission case 10, there are provided a gear speed changer apparatus (not shown) switchable to any one of a plurality of forward traveling speeds and rear traveling speed, a rear wheel differential mechanism (not shown), and right and left rear wheel brakes (not shown). Power of the engine 9 is transmitted to the hydrostatic stepless speed changer apparatus 18; then, the power from this hydrostatic stepless speed changer apparatus 18 is transmitted via the gear speed changer apparatus and the rear wheel differential mechanism in the transmission case 10 to right and left drive shafts 21 and eventually to the right and left rear wheels 2. Power from the gear speed changer apparatus is transmitted via a transmission shaft 20 to the front wheel differential mechanism 19 and via right and left drive shafts 22 and eventually to the right and left front wheels 1.

Figure 4:
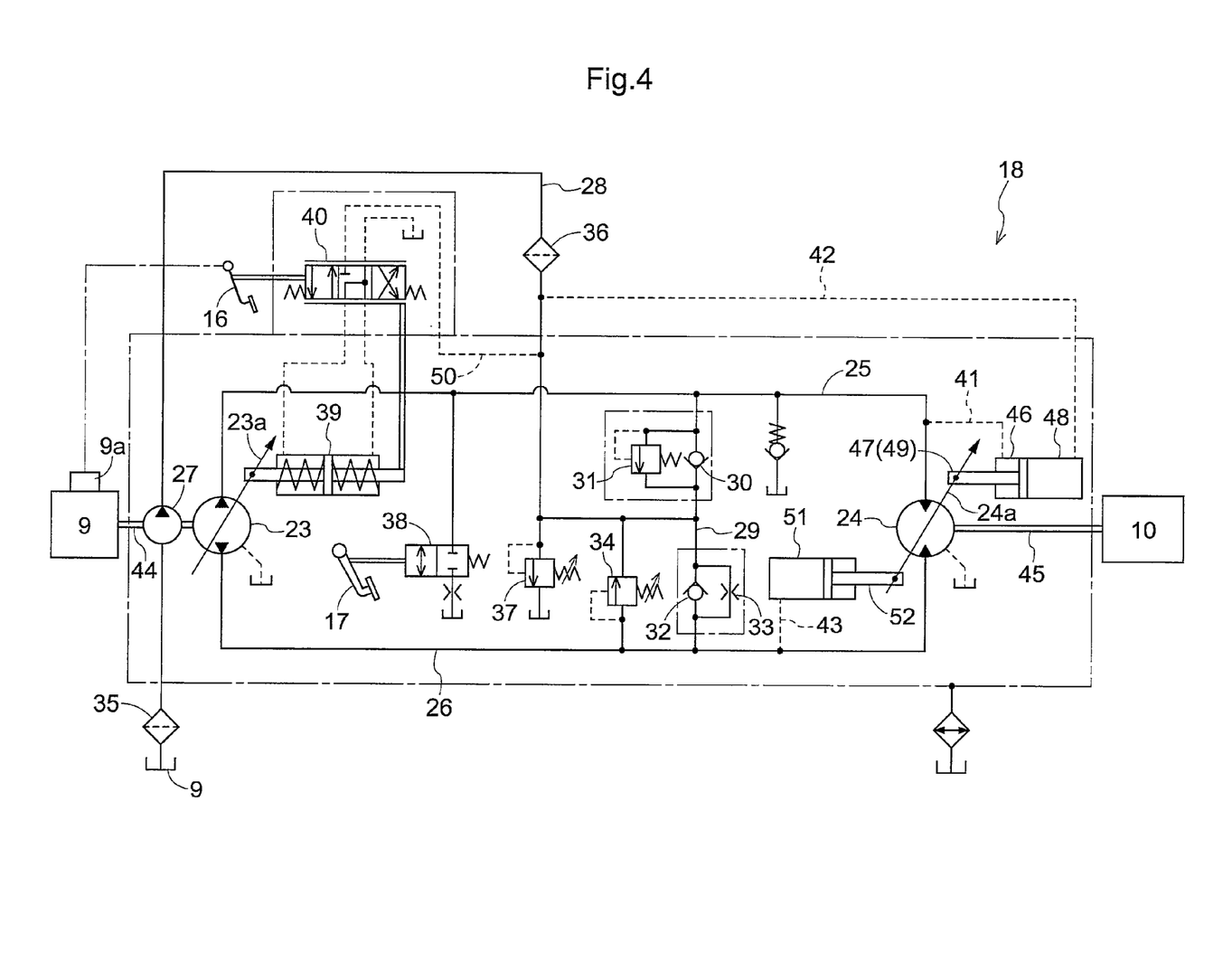
FIG. 4 is a hydraulic circuit diagram of the hydrostatic stepless speed changer apparatus.

As shown in FIG. 4, the speed changer pedal 16 is used for effecting operations of the hydrostatic stepless speed changer apparatus 18 and an accelerator operational unit 9a of the engine 9. And, the speed changer lever 14 is used for operating the gear speed changer apparatus. There are provided right and left front wheel brakes (not shown). The brake pedal 17 is used for operating the right and left front wheel brakes and right and left rear wheel brakes into braking states respectively. For parking, the brake lever 15 will be used for operating the right and left rear wheel brakes into the braking state and maintaining the brakes under this braking state.

[3]

Next, the hydrostatic stepless speed changer apparatus 18 will be explained.

Figure 3:
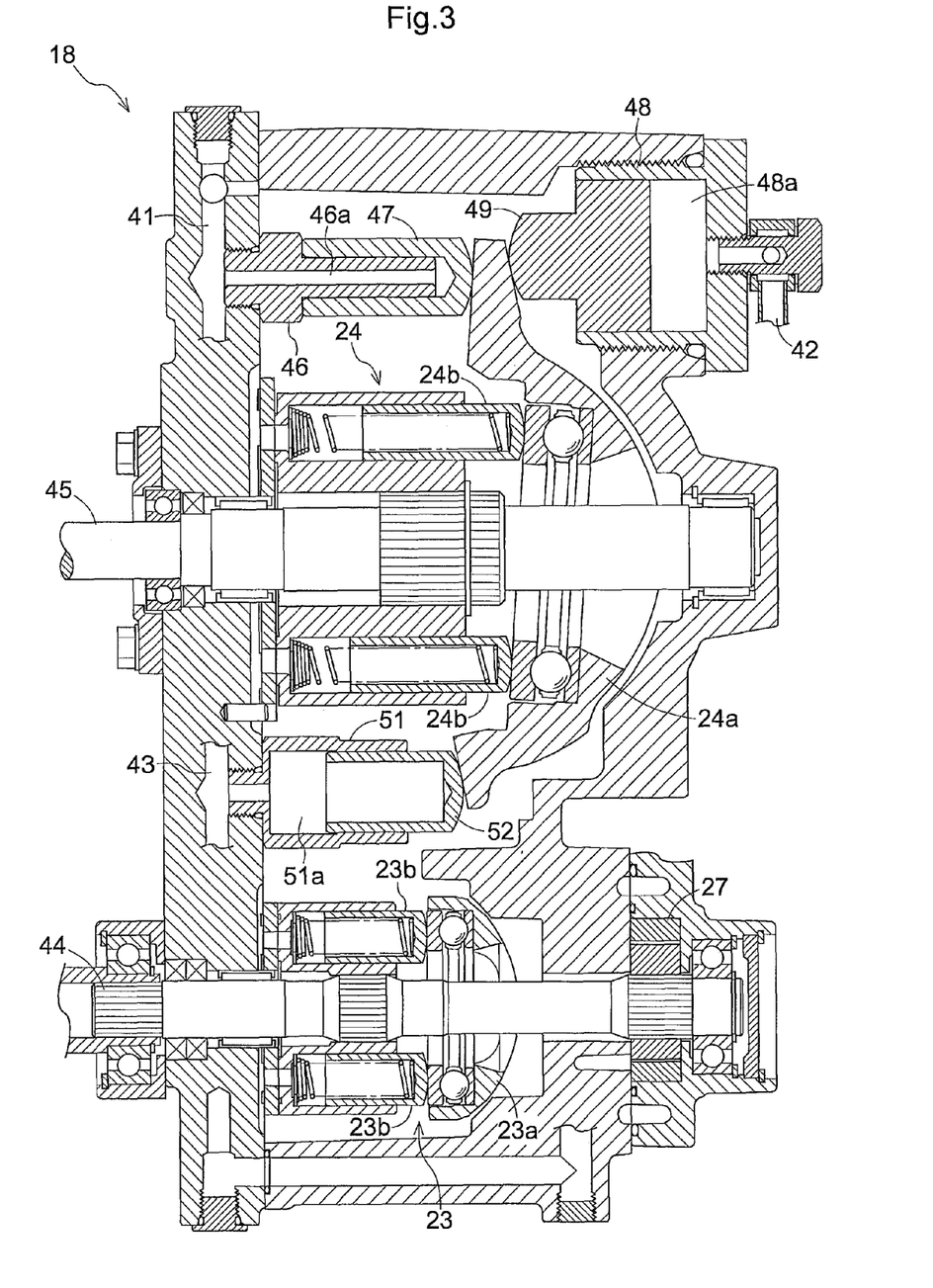
FIG. 3 is a side view in vertical section of a hydrostatic stepless speed changer apparatus.

As shown in FIGS. 2, 3 and 4, the hydrostatic stepless speed changer apparatus 18 is configured such that a hydraulic pump 23 is disposed downwardly and a hydraulic motor 24 is disposed obliquely upwardly of the hydraulic pump 23. And, this hydrostatic stepless speed changer apparatus 18 is connected to the rear portion of the transmission case 10. The hydraulic pump 23 is comprised of e.g. a plunger 23b rotatable in unison with an input shaft 44 which receives the power of the engine 9, a swash plate 23a which determines the stroke of the plunger 23b. And a charge pump 27 is connected to the end of the input shaft 44, so that the hydraulic pump 23 and the charge pump 27 are driven by the engine 9.

As shown in FIG. 3 and FIG. 4, the hydraulic motor 24 is comprised of e.g. a plunger 24b rotatable in unison with an output shaft 45, a swash plate 24a which determines the stroke of the plunger 24b, etc. The hydraulic pump 23 and the hydraulic motor 24 are configured as stepless variable displacement type. And, the hydraulic pump 23 and the hydraulic motor 24 are connected to each other via a high-pressure oil passage 25 and a low-pressure oil passage 26.

As shown in FIG. 4, as the hydraulic pump 23 is driven by the engine 9, an amount of work oil from the hydraulic pump 23 is fed via the high-pressure oil passage 25 to the hydraulic motor 24, whereby this hydraulic motor 24 is driven. And, the work oil from the hydraulic motor 24 is returned via the low-pressure oil passage 26 to the hydraulic pump 23. And, the power of the hydraulic motor 24 is transmitted via an output shaft 45 to the gear speed change apparatus in the transmission case 10.

As shown in FIG. 4, a feed oil passage 29 is connected to and between the high-pressure oil passage 25 and the low-pressure oil passage 26; and a charge oil passage 28 from the charge pump 27 is connected to the feed oil passage 29. At a portion of the feed oil passage 29 on the side of the high-pressure oil passage 25, there are incorporated in juxtaposition a check valve 30 and a relief valve 31 which determines the upper limit of the pressure of the high-pressure oil passage 25. At a portion of the feed oil passage 29 on the side of the low-pressure oil passage 26, there are incorporated in juxtaposition a check valve 32 and a constricted portion 33. A variable relief valve 34 which determines the upper limit of the pressure of the low-pressure oil passage 26 is connected to and between the low-pressure oil passage 26 and the charge oil passage 28.

As shown in FIG. 4, an amount of lubricant as the work oil of the transmission case 9 is fed via a filter 35 to the charge pump 27. Then, from this charge pump 27, the work oil is fed to the charge oil passage 28, a filter 36 and the feed oil passage 29 to the high-pressure oil passage 25 and the low-pressure oil passage 26. A variable relief valve 37 is provided which determines the upper limit of the pressure of the charge oil passage 28.

As shown in FIG. 4, an unloading valve 38 urged to its closing side is connected to the high-pressure oil passage 25. And, the brake pedal 17 and the unloading valve 38 are mechanically coupled to each other. With this, when the brake pedal 17 is stepped on (i.e. when the right and left front wheel brakes and the right and left rear wheel brakes are operated to their braking states), the unloading valve 38 is operated to its open position, so that no work oil is fed to the hydraulic motor 24.

[4]

Next, the operational arrangement of the hydraulic pump 23 will be explained.

As shown in FIG. 4, there are provided a double-action operational cylinder 39 for operating the swash plate 23a of the hydraulic pump 23 and a control valve 40 for operating this operational cylinder 39. And, to this control valve 40, there is connected a pilot oil passage 50 which branches from a portion of the charge cylinder 28 on the downstream side of the filter 36. And, with a pilot pressure branched from the charge oil passage 28, the operational cylinder 39 is activated. The speed changer pedal 16 and the control valve 40 are mechanically coupled with each other, and the speed changer pedal 16 and the accelerator operational unit 9a of the engine 9 are mechanically coupled with each other and the speed changer pedal 16 is urged to its returning side.

As shown in FIG. 4, when the speed changer pedal 16 is not stepped on, the engine 9 is rendered into an idling state, and the swash plate 23a of the hydraulic pump 23 is operated to its neutral position. When the speed changer pedal 16 is stepped on, the accelerator operational portion 9a of the engine 9 is operated to a position corresponding to the stepped-on position of the speed changer pedal 16, and the swash plate 23a of the hydraulic pump 23 is operated by the control valve 40 and the operational cylinder 39 to a high-speed side angle corresponding to the stepped-on position of the speed changer pedal 16.

[5]

Next, the operational arrangement of the hydraulic motor 24 will be explained.

As shown in FIG. 3 and FIG. 4, a support member 46 having a through hole 46a, a piston unit 47 slidably supported to the support member 46 and placed in contact with the upper portion (the left side in the plane of FIG. 3 illustration) of a swash plate 24a of the hydraulic motor 24, a cylindrical support member 48 having an oil chamber 48a thereof, a piston unit 49 slidably supported to the support member 48 and placed in contact with the upper portion (the right side in the plane of FIG. 3 illustration) of the swash plate 24a of the hydraulic motor 24 are provided upwardly of the hydraulic motor 24 in parallel with an output shaft 45. The support members 46,48 and the piston units 47, 49 together constitute a hydraulic actuator.

As shown in FIG. 3 and FIG. 4, a first pilot oil passage 41 (first pilot pressure) branched form the high-pressure oil passage 25 is connected to the support member 46. When the piston unit 47 is moved to the right side in the plane of FIG. 3 illustration by the first pilot pressure (first pilot oil passage 41), the swash plate 24a of the hydraulic motor 24 is moved to the low speed side. A second pilot oil passage 42 (second pilot pressure) branched from a portion of the charge oil passage 28 on the downstream side of the filter 36 is connected to the support member 48. When the piston unit 49 is moved to the left side in the plane of FIG. 3 illustration by the second pilot pressure (second pilot oil passage 42), the swash plate 24a of the hydraulic motor 24 is operated to the high speed side.

As shown in FIG. 3 and FIG. 4, a support member 51 (corresponding to "an operational mechanism") having an oil chamber 51a therein and a piston unit 52 (corresponding to "an operational mechanism") slidably supported to the support member 51 and placed in contact with the lower portion (the left side in the plane of FIG. 3 illustration) of the swash plate 24a of the hydraulic motor 24 are provided between the hydraulic pump 23 and the hydraulic motor 24 in parallel with an input shaft 44. A third pilot oil passage 43 (a third pilot pressure) branched from the low-pressure oil passage 26 is connected to the support member 51. Then, as the piston unit 52 is moved to the right side in the illustration with the third pilot pressure (third pilot oil passage 43), the swash plate 24a of the hydraulic motor 24 is operated to the high speed side.

With the above-described arrangement, the swash plate 24a of the hydraulic motor 24 will be operated to an angle at which equilibrium is established among the three force components: the force of the piston unit 47 by the first pilot pressure (first pilot oil passage 41), the force of the piston unit 49 by the second pilot pressure (second pilot oil passage 42), and the force of the piston unit 52 by the third pilot pressure (third pilot oil passage 43).

As indicated by the solid line L2 in FIG. 5, when the first pilot pressure (first pilot oil passage 41) (the pressure of the high-pressure oil passage 25) is lower than the pressure A2, the swash plate 24a of the hydraulic motor 24 is operated to the minimal angle (high speed). When the first pilot pressure (first pilot oil passage 41) (the pressure of the high-pressure oil passage 25) rises from the pressure A2, the swash plate 24a of the hydraulic motor 24 is operated rather sharply to the low speed side from the minimal angle (high speed). When the first pilot pressure (the first pilot oil passage 41) reaches a pressure A3 which is relatively close to the the pressure A2, the swash plate 24a of the hydraulic motor 24 is operated to the maximum angle (low speed).

[6]

Next, there will be described a situation wherein even if the traveling load increases from the normal traveling condition, the traveling speed of the vehicle body is maintained constant for a certain period of time despite the increase and the traveling speed does not decrease very rapidly.

As shown in FIG. 4 and indicated by the solid line L2 in FIG. 5, for instance, when the normal traveling condition (i.e. the condition wherein there is no reduction in the rotational speed of the engine 9 and the swash plate 24a of the hydraulic motor 24 is not operated to its minimal angle (high speed) with a stepping-on operation of the speed changer pedal 16 is shifted to an upslope traveling, since the rotational speed of the engine 9 is not yet reduced and the second pilot pressure (discharging pressure of the charge pump) is still relatively high. So, even when the traveling load rises (even if the pressure of the high-pressure oil passage 25 rises), due to the resistance provided by the relatively high second pilot pressure (second pilot oil passage 42), the piston unit 47 cannot be moved easily to the low speed side, so the swash plate 24a of the hydraulic motor 24 will not be operated immediately to the low speed side.

In this case, as shown in FIG. 4, as the third pilot pressure (third pilot oil passage 43) also is added to the resistance of the second pilot pressure (second pilot oil passage 42), it is difficult for the piston units 47, 49 to be moved to the low speed side, so that the swash plate 24a of the hydraulic motor 24 will not be operated immediately to the low speed side.

In this way, in the range where the first pilot pressure (first pilot oil passage 41) is lower than the pressure A2, the swash plate 24a of the hydraulic motor 24 is maintained to the minimal angle (high speed), so that the traveling speed of the vehicle body is maintained constant. Whereas, in response to rise in the pressure of the high-pressure oil passage 25 due to rise in the traveling load, the output torque of the hydraulic motor 24 rises moderately.

Thereafter, as shown in FIG. 4 and indicated by the solid line L2 in FIG. 5, due to the rise of the first pilot pressure (first pilot oil passage 41) associated with the increase of the traveling load as well as the reduction of the second pilot pressure (second pilot oil passage 42) associated with reduction in the rotational speed of the engine 9 due to the increase of the traveling load, the first pilot pressure (first pilot oil passage 41) reaches the pressure A2 and then rises from this pressure A2. In response to this, with the first pilot pressure (first pilot oil passage 41), the piston unit 47 is moved to the low speed side and the swash plate 24a of the hydraulic motor 24 is operated from the minimal angle (high speed) to the low speed side.

[7]

Next, there will be explained a situation wherein under the condition of relatively high traveling load, if this traveling load further increases, the operation of the swash plate 24a of the hydraulic motor 24 is effected without delay.

As indicated by the solid line L2 in FIG. 5, when the first pilot pressure (first pilot oil passage 41) (the pressure of the high-pressure oil passage 25) reaches the pressure A2 and then rises from this pressure A2, due to the rise of the first pilot pressure (first pilot oil passage 41) associated with the increase of the traveling load as well as the reduction of the second pilot pressure (second pilot oil passage 42) associated with reduction in the rotational speed of the engine 9 due to the increase of the traveling load, the swash plate 24a of the hydraulic motor 24 is operated rather sharply to the low speed side by the piston unit 47. And, when the first pilot pressure (first pilot oil passage 41) reaches the pressure A3 which is relatively close to the the pressure A2, the swash plate 24a of the hydraulic motor 24 is operated to the maximum angle (low speed).

As shown in FIG. 4 and indicated by the solid line L2 in FIG. 5, in the situation where the traveling load is relative high (the pressure of the high-pressure oil passage 25 is relatively high) and the swash plate 24a of the hydraulic motor 24 is operated to the low speed side, it is likely that reduction in the rotational speed of the engine due to the significant traveling load has occurred already, so that the second pilot pressure (discharging pressure of the charge pump) too has been reduced already.

Under the above-described condition, if the traveling load further increases, since the second pilot pressure (second pilot oil passage 42) is relatively low, the resistance of the second pilot pressure (second pilot oil passage 42) is small, with the first pilot pressure (first pilot oil passage 41), the piston unit 47 is moved immediately to the low speed side so that the swash plate 24a of the hydraulic pump 24 is operated to the low speed side without delay.

In the foregoing sections [5], [6] and in this section [7], by varying the outer diameters (pressure receiving areas) of the piston units 47, 49 or varying the outer diameter (pressure receiving area) of the piston unit 52, it is possible to move the portion of the solid line L2 in FIG. 5 between the pressure A2 and the pressure A3 entirely to the lower pressure side (the left side in the figure) or entirely to the higher pressure side (the right side in the figure).

[8]

Next, there will be explained a situation wherein the action of the dynamic brake is attenuated when the speed changer pedal 16 is returned in order to limit the traveling speed of the vehicle body on a downslope or the like for instance.

As shown in FIG. 4, if the speed changer pedal 16 is returned in order to limit the traveling speed of the vehicle body on a downslope or the like for instance, the swash plate 23a of the hydraulic pump 23 is operated to the low speed side and simultaneously the accelerator operational portion 9a of the engine 9 is operated to the low speed side.

Under this condition, when the hydraulic motor 24 is driven by the reverse drive force from the ground surface, with the work oil discharged from the hydraulic motor 24, the pressure of the low-pressure oil passage 26 becomes higher than the pressure of the high-pressure oil passage 25, so that the hydraulic pump 23 will be driven by the work oil discharged from the hydraulic motor 24 (low-pressure oil passage 26).

Under the above-described condition, if the speed changer pedal 16 is returned and the swash plate 23a of the hydraulic pump 23 is operated to the low speed side and simultaneously the accelerator operational portion 9a of the engine 9 is operated to the low speed side, driving of the hydraulic pump 23 is made difficult (the condition of forcibly driving the engine 9 driving the hydraulic pump 23 at a high speed) and also driving of the engine 9 is made difficult, so that driving resistance for the hydraulic pump 23 is increased. In this way, the dynamic brake corresponding to the engine brake of a standard passenger automobile is put into action.

However, if the returning operation of the speed changer pedal 16 is effected excessively, the dynamic brake will become too effective, thus leading to sudden speed reduction of the vehicle body and deterioration of the riding comfort. This phenomenon appears more conspicuously when there is a significant difference between the capacity (discharging amount) (angle of the swash plate 24a) of the hydraulic motor 24 and the capacity (discharging amount) (angle of the swash plate 23a) of the hydraulic pump 23.

In this case, as shown in FIG. 4, when the hydraulic motor 24 is driven by the reverse drive force from the ground surface, with the work oil discharged from the hydraulic motor 24, the pressure of the low-pressure oil passage 26 becomes higher than the pressure of the high-pressure oil passage 25, with the third pilot pressure (third pilot oil passage 43), the piston unit 52 operates the swash plate 24a of the hydraulic motor 24 to the high speed side (the smaller side of capacity (discharging amount)).

Therefore, even when in response to the returning operation of the speed changer pedal 16, the swash plate 23a of the hydraulic pump 23 is operated to the low speed side (the smaller side of capacity (discharging amount)) and the accelerator operational portion 9a of the engine 9 is operated to the low speed side, as the swash plate 24a of the hydraulic motor 24 also will be operated to the high speed side (the smaller side of capacity (discharging amount)), the difference between the capacity (discharging amount) (angle of the swash plate 24a) of the hydraulic motor 24 and the capacity (discharging amount) (angle of the swash plate 23a) of the hydraulic pump 23 is restricted, whereby the effect of the dynamic brake is attenuated.

First Alternative Embodiment of the Invention

Figure 6:
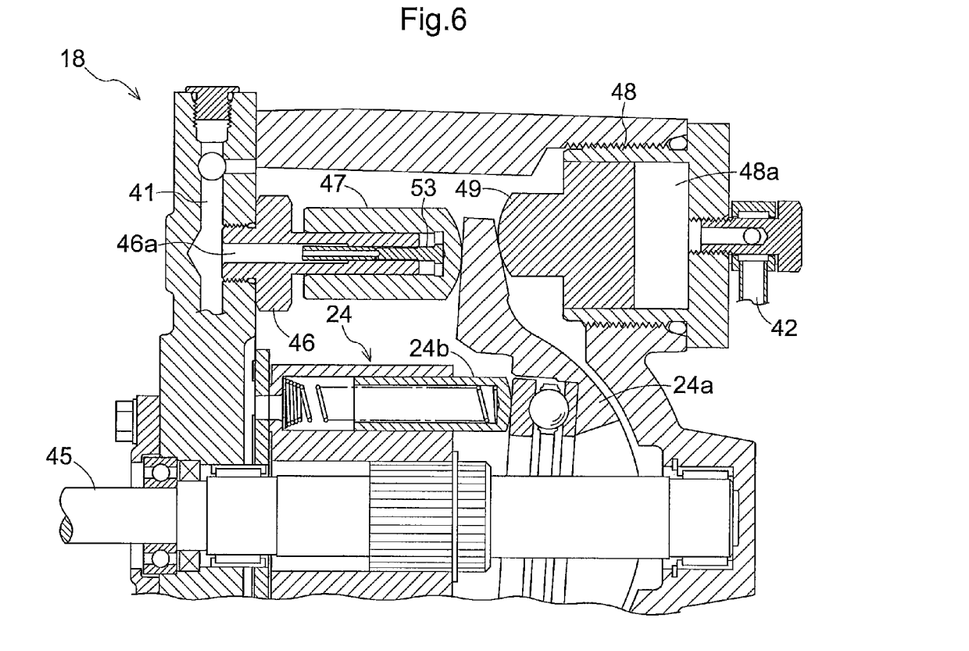
FIG. 6 is side view in vertical section showing the vicinity of a hydraulic motor of the hydrostatic stepless speed changer apparatus according to a first alternative embodiment of the present invention.
Figure 7:
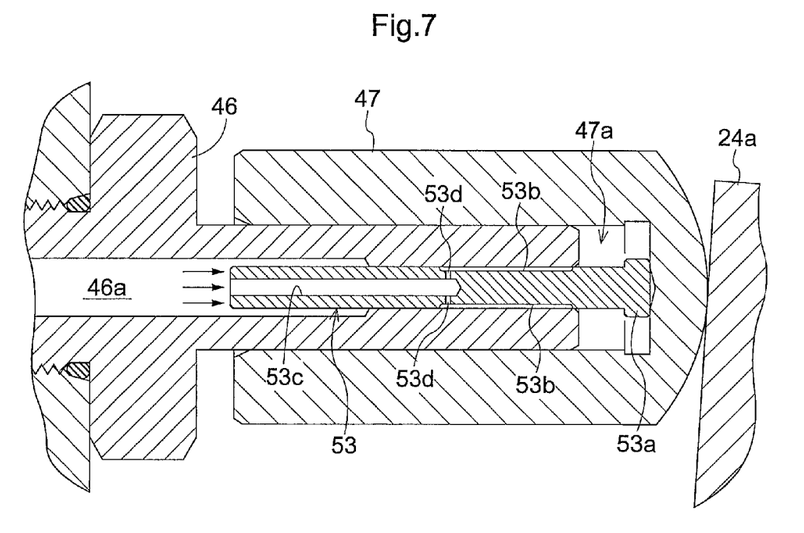
FIG. 7 is a side view in vertical section showing a condition of a former half of an operation of a piston unit in the first alternative embodiment of the present invention.
Figure 8:
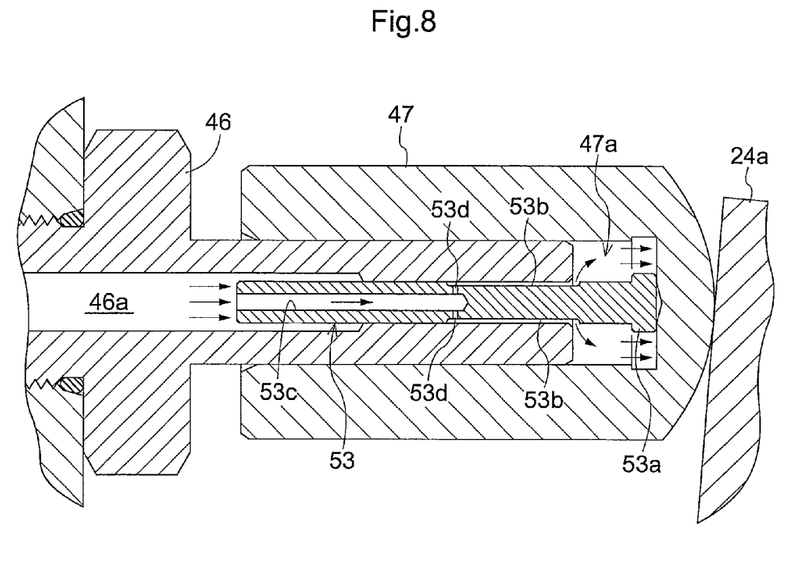
FIG. 8 is a side view in vertical section showing a condition of a latter half of the operation of the piston unit in the first alternative embodiment of the present invention.

In the foregoing [Description of Embodiment], the support member 46 and the piston unit 47 shown in FIG. 3 may alternatively be configured as shown in FIGS. 6, 7 and 8.

As shown in FIG. 6 and FIG. 7, inside the piston unit 47, an auxiliary piston portion 53 is slidably engaged within a through hole 46a formed in the support member 46 and a head 53a of the auxiliary piston portion 53 is placed in contact with the interior of an oil chamber 47a of the piston unit 47. Further, along the entire circumference of the outer periphery of an intermediate portion of the auxiliary piston portion 53, a recessed portion 53b is formed and at the end of the auxiliary piston portion 53, there is formed a hole portion 53c communicated to the end of the auxiliary piston portion 53. And, there is provided a small-diameter hole portion 53d (functioning as "a constricted portion") communicated to and between the recessed portion 53b and the hole portion 53c.

As shown in FIG. 7, under the condition where the swash plate 24a of the hydraulic motor 24 is operated to the minimal angle (high speed), the recessed portion 53b of the auxiliary piston portion 53 does not reach the leading end of the support member 46, so that the recessed portion 53b of the auxiliary piston portion 53 and the oil chamber 47a of the piston portion 47 are isolated from each other. Under this condition, if the first pilot pressure (first pilot oil passage 41) is fed to the through hole 46a of the support member 46, this first pilot pressure (first pilot oil passage 41) acts on only the auxiliary piston portion 53, not on the oil chamber 47a of the piston portion 47. With this, the sectional area of the auxiliary piston portion 53 except its head 53a becomes the pressure receiving area for the first pilot pressure (first pilot oil passage 41), so that a relatively small force is applied to the piston portion 47 via the auxiliary piston portion 53.

With the above-described relatively small force, the auxiliary piston portion 53 is moved to the right side in the illustration of FIG. 7. And, as shown in FIG. 8, when the recessed portion 53b of the auxiliary piston portion 53 reaches the terminal end of the support member 46, the recessed portion 53b of the auxiliary piston portion 53 is opened up, whereby communication is established between the oil chamber 47a of the piston portion 47 and the recessed portion 53b of the auxiliary piston portion 53.

With the above, the first pilot pressure (first pilot oil passage 41) enters the recessed portion 47a of the piston portion 47, whereby the sectional area of the oil chamber 47a of the piston unit 47 becomes the pressure receiving area for the first pilot pressure (first pilot oil passage 41), whereby a relatively large force is applied to the piston unit 47.

Second Alternative Embodiment of the Present Invention

In the foregoing [Description of Embodiment] and [First Alternative Embodiment of the Invention], instead of branching the third pilot oil passage 43 shown in FIG. 3 and FIG. 4 from the low-pressure oil passage 26, this third pilot oil passage 43 may be branched from the charge oil passage 28 and connected to the support member 51.

With the above-described arrangement, the relatively high second pilot pressure (second pilot oil passage 42) is applied to both the piston unit 47 and the piston unit 52. As a result, it becomes possible to further delay the operation of the swash plate 24a of the hydraulic motor 24 to the low speed side when the traveling load rises from the normal traveling condition. Hence, it becomes possible to obtain an arrangement particularly suitable for a work vehicle which places more importance on maintaining vehicle traveling speed constant.

Third Alternative Embodiment of the Invention

In the foregoing [Description of Embodiment] and [First Alternative Embodiment of the Invention], the third pilot oil passage 43 shown in FIG. 3 and FIG. 4 may be omitted, and the support member 51 may incorporate a coil spring (not shown) for urging the piston unit 52 to its projecting side.

Fourth Alternative Embodiment of the Invention

In the foregoing [Description of Embodiment] and [First Alternative Embodiment of the Invention] through [Third Alternative Embodiment of the Invention], the support member 48, 51 shown in FIG. 3 may incorporate a coil spring (not shown) for urging the piston unit 49, 52 to its projecting side.

With the above-described arrangement, the angle of the swash plate 24a of the hydraulic motor 24 where equilibrium is established among the three force components: the force of the piston unit 47 due to the first pilot pressure (pilot oil passage 41), the force of the piston unit 49 due to the second pilot pressure (second pilot oil passage 42) and the force of the piston unit 52 due to the third pilot pressure (third pilot oil passage 43) can be finely adjusted by means of addition and/or change of the coil spring.

Fifth Alternative Embodiment of the Invention

In the foregoing [Description of Embodiment] and [First Alternative Embodiment of the Invention] through [Fourth Alternative Embodiment of the Invention], the support member 51 and the piston unit 52 shown in FIG. 3 and FIG. 4 may be omitted. With this arrangement, the swash plate 24a of the hydraulic motor 24 is operated to an angle where equilibrium is established between the two force components: the force of the piston unit 47 due to the first pilot pressure (pilot oil passage 41) and the force of the piston unit 49 due to the second pilot pressure (second pilot oil passage 42).

Sixth Alternative Embodiment of the Invention

In the foregoing [Description of Embodiment] and [First Alternative Embodiment of the Invention] through [Fifth Alternative Embodiment of the Invention], the support member 48, 51 and the piston unit 49, 52 shown in FIG. 3 may be comprised of a single double-action hydraulic cylinder.

Incidentally, the application of the present invention is not limited to a utility vehicle for effecting e.g. transport of agricultural produces or luggage or the like. The invention may be applied also to other kinds of work vehicle having a hydrostatic stepless speed changer apparatus for vehicle traveling, such as a tractor, a riding type grass mower, etc.

The invention claimed is:

1. A work vehicle comprising:
   an engine;
   a traveling hydrostatic stepless speed changer apparatus including,
      a variable displacement type hydraulic pump driven by the engine;
      a variable displacement type hydraulic motor driven by work oil from the hydraulic pump, and
      a high-pressure oil passage and a low-pressure oil passage connecting the hydraulic pump with the hydraulic motor;
   a hydraulic actuator for operating a swash plate of the hydraulic motor; and
   a charge pump driven by the engine for feeding the work oil to the high-pressure oil passage and the low-pressure oil passage;
   wherein the hydraulic actuator is arranged such that the hydraulic actuator operates the swash plate of the hydraulic motor by a first pilot pressure and a second pilot pressure, the first pilot pressure being branched from the high-pressure oil passage and applied to the hydraulic actuator for operating the swash plate of the hydraulic motor to a low speed side, the second pilot pressure being branched from the charge pump and applied to the hydraulic actuator for operating the swash plate of the hydraulic motor to a high speed side.

2. A work vehicle according to claim 1, wherein there is provided an operational mechanism for urging the swash plate of the hydraulic motor to the high speed side.

3. A work vehicle according to claim 2, wherein the operational mechanism urges the swash plate of the hydraulic motor to the high speed side by a third pilot pressure branched from the low-pressure oil passage.

* * * * *